S. A. HUNTER.
CONSTRUCTION FOR PNEUMATIC TIRES.
APPLICATION FILED NOV. 23, 1914.
1,145,993. Patented July 13, 1915.
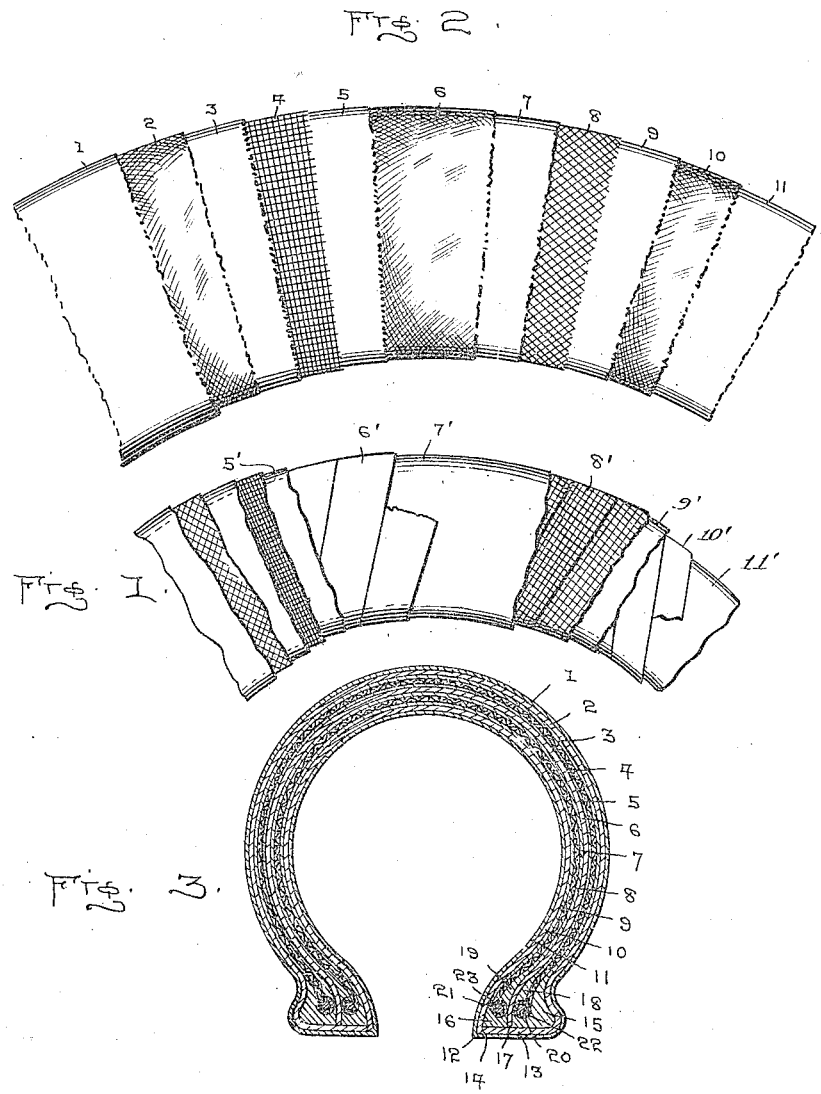

UNITED STATES PATENT OFFICE.

STUART A. HUNTER, OF NEWTON, KANSAS.

CONSTRUCTION FOR PNEUMATIC TIRES.

1,145,993.　　　　　Specification of Letters Patent.　　Patented July 13, 1915.

Application filed November 23, 1914. Serial No. 873,594.

*To all whom it may concern:*

Be it known that I, STUART A. HUNTER, a citizen of the United States, residing at Newton, in the county of Harvey and State of Kansas, have invented certain new and useful Improvements in Construction for Pneumatic Tires; and I do hereby declare the following to be a full, clear, and exact description of the invention, such as will enable others skilled in the art to which it appertains to make and use the same.

This invention relates to new and useful improvements in automobile tires, and particularly to that class wherein pneumatic tubes are used for cushioning purposes.

The object of this invention is to provide an internally armored automobile tire or shoe which will withstand great stress and strain, with durable and lasting qualities and one that will be comparatively light in construction.

Other objects and advantages will be hereinafter set forth and more particularly pointed out in the accompanying specification.

In the accompanying drawings which are made a part of this application, Figure 1 is an elevation of a portion of the tire showing the manner of applying the various layers forming the tire, portions of the layers being omitted. Fig. 2 is a similar view showing a slightly different manner of arranging the various folds comprising the tire, and Fig. 3 is a transverse sectional view of the form of tire shown in Fig. 2.

Referring to the drawings, 1 is an outer coating of rubber, which is preferably mounted upon a section of fabric tubing preferably of canvas, which fabric is engaged on its opposite face with a layer of rubber 3. Immediately below the rubber 3 and embedded therein is the outer metallic fabric 4 of wire, preferably of copper or aluminum. The weave of the strands forming the wire mesh being such that the wires extended in one direction will rest at right angles to the wires extended in the opposite direction, thus causing a square mesh in the wire, and the fabric 4 is so applied that certain of said strands will extend longitudinally of the tire, and the other strands transversely or around the tire.

The fabric 4 is mounted upon another layer of rubber 5 and immediately below said layers 5 is an additional layer of fabric 6 then a layer of rubber 7, an inner layer of metallic fabric 8, the strands of which are arranged to extend diagonally of the trend of the tire. Immediately below the metallic fabric 8 is another layer of rubber 9, an additional layer of fabric 10 and the inner coating of rubber 11, all of said layers being employed to construct the tire.

As shown in Fig. 1 of the drawings the same number of layers are employed to complete the tire, but the sections of fabric 6' and 10' are formed in strips of predetermined width, which strips are directed at an angle or trend diagonally to the longitudinal trend of the tire, the trend of the strips 6' being opposed to the trend of the strips 10'. The coverings of rubber 9' and 11' and 5' and 7' for the sections 10' and 6' respectively, serve to unite or hold each succeeding wind or strip of the fabric abutted against the preceding wind. In this construction, the wire fabric 8' is also preferably cut in strips and said strips are so placed that the trend of the wires forming the mesh will be diagonal to the longitudinal trend of the tire, the layers of rubber 9' and 7', also serving to hold the strips of wire mesh in proper position and abutted against each other.

While I have shown a predetermined number of layers of fabric and wire, it will be understood that these layers may be increased or decreased as the occasion may require, depending upon the size of the tire and weight of the car upon which the same is used. By this arrangement it is noted that a structure of canvas having a rubber covering on each side thereof is placed interior and exterior of the inner and outer metallic fabrics, and a similar layer between said metallic fabrics, and by the arrangement of the two metallic fabrics, it will be seen that the wire strands of the metallic fabric 8 run diagonally to the longitudinal direction of the tire, while the wire strands of the metallic fabric 4 run longitudinally and transversely respectively of the longitudinal direction of the tire.

As shown in Fig. 3 of the drawings, the clencher heel portion of the tire is so constructed that the outer coating 1 unites integrally with the inner coating 11, said point of union taking place at the lower corner, as shown at 12 and that the canvas fabric 2 is brought inward as at 13 and abuts against the end 14 of the canvas fabric 10. The rubber coating 3 is enlarged as at 15 in the heel portion and likewise the rubber coating 9 is enlarged as at 16, the portion 13 of the canvas fabric 2 supporting the edges of the enlarged portions 15 and 16. The enlarged portions 15 and 16 are divided by means of a central interior canvas fabric 6, the edge of which abuts against the portion 13, as shown at 17. The rubber strips 5 and 7 are likewise enlarged as at 18 and 19, thereby causing the enlarged portions of the rubber coating 18 and 19 and 15 and 16 to thoroughly inclose the coil portions 20 and 21 of the metallic fabrics 4 and 8, which are wrapped around and retained in position by means of the longitudinal stay wires 22 and 23, said stay wires operating as a reinforcement to the clencher heel portion of the tire.

The structure shown in Fig. 2 is the same as that shown in Fig. 1, with the exception that the fabrics 6 and 10 are not formed in narrow strips like the fabrics 6' and 10', said fabrics 6 and 10 extend in a line with the trend of the tire, also the wire fabric 8 is not in strip formation as is the fabric 8', although the fabric is so woven that the strands forming the same will extend at an angle diagonally to the longitudinal trend of the tire.

It will thus be seen that in both of the forms shown in Figs. 1 and 2, the wire strands of one metallic fabric will rest in crossed relation with the strands of the other metallic fabric and that the strands of the inner metallic fabric will be at an angle or diagonal, to the longitudinal trend of the tire.

Having now described my invention what I claim as new and desire to secure by Letters-Patent is:—

1. A tire comprising a plurality of canvas fabrics having a rubber coating on each surface thereof, an interior wire screen fabric placed between certain of said canvas fabrics so that the wire strands of said metallic fabric will run diagonally to the longitudinal direction of the tire and an exterior wire screen fabric placed between other of said canvas fabrics so that the wire strands will run longitudinally and at right angles to the longitudinal direction of the tire.

2. A tire, comprising; a plurality of layers of fabric, and a plurality of layers of wire mesh fabric interposed between certain of said layers, a portion of said wire mesh fabrics having the strands running diagonally of the tire and the balance of said wire mesh fabrics running lengthwise of said tire.

In testimony whereof I have signed my name to this specification in the presence of two subscribing witnesses.

STUART A. HUNTER.

Witnesses:
A. E. HURFORD,
EDITH CARTER.